Jan. 27, 1931.  L. G. SIMJIAN  1,790,250
ILLUMINATING APPARATUS FOR PHOTOGRAPHIC USE
Filed March 24, 1928
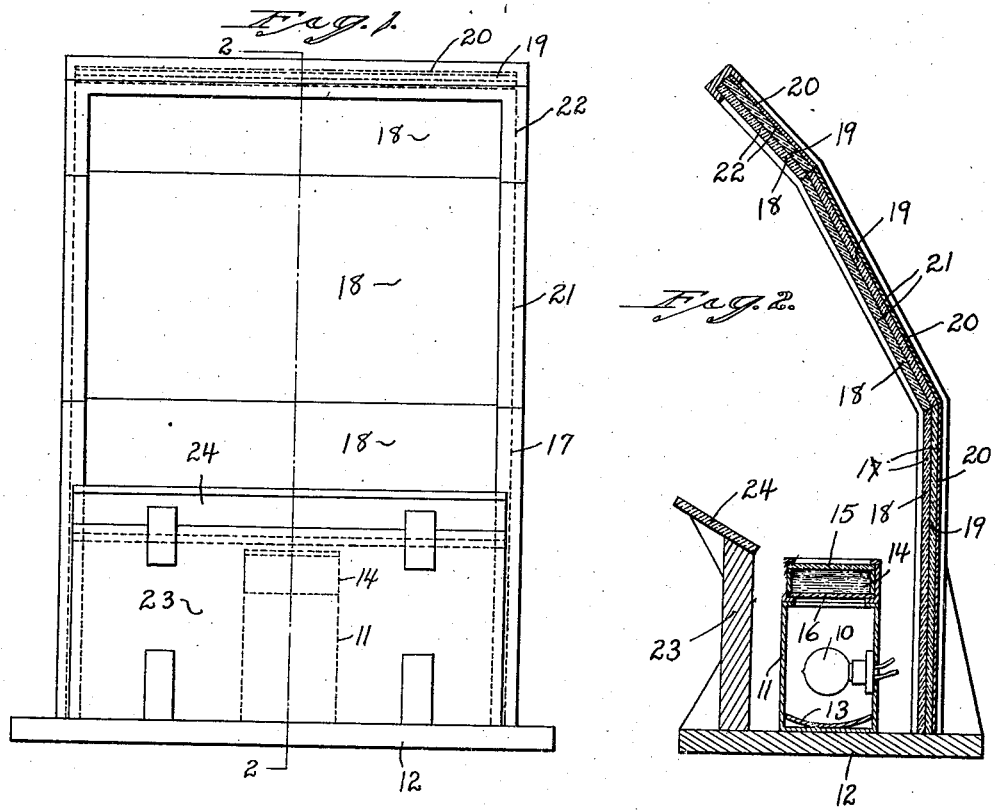
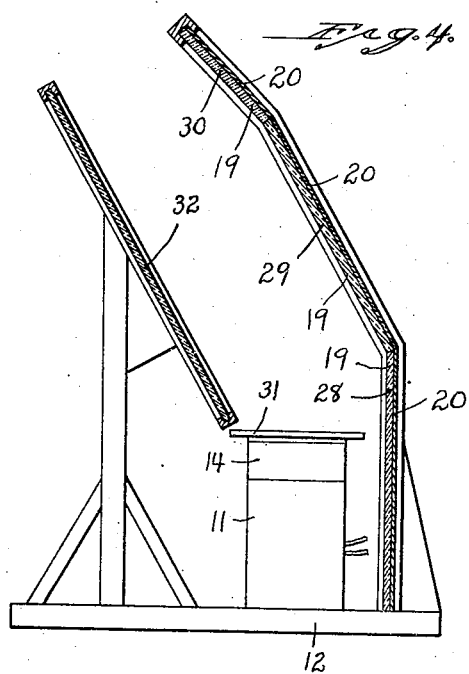
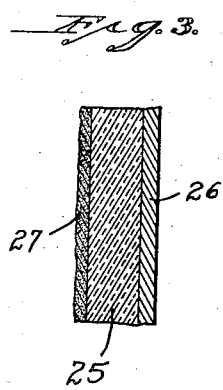

Patented Jan. 27, 1931

1,790,250

UNITED STATES PATENT OFFICE

LUTHER G. SIMJIAN, OF NEW HAVEN, CONNECTICUT

ILLUMINATING APPARATUS FOR PHOTOGRAPHIC USE

Application filed March 24, 1928. Serial No. 264,494.

In portrait photography, in particular, the nature of the light employed to illuminate the subject is of the utmost importance, since naturalness of expression is the end striven for. Daylight illumination of the subject is generally recognized as the most suitable for portrait photography, since its relatively-cool and well-diffused character does not occasion eye-strain and cause the subject to squint or otherwise involuntarily distort his features.

Artificial light, however, must necessarily be employed where daylight is not available, and it is the object of this invention to provide means for illuminating a subject by artificial light, of such nature as to closely approximate daylight in its diffusion and, therefore, minimize the discomfort of the subject and his tendency to assume unnatural and strained expressions.

With this object in view, my invention consists in an illuminating apparatus for photographic use comprising a source of artificial light, a shield for preventing the rays of light emanating from the said source from beating unmodified upon the subject, a reflecting medium positioned to reflect upon the subject the light emanating from the said source, and a light-diffusing medium positioned so as to be interposed between the said light-source and the reflecting medium, and also between the latter and the subject, whereby light rays emanating from the said light-source are diffused before being reflected by the said reflecting medium and again diffused after being reflected thereby toward the subject.

In the accompanying drawings:

Fig. 1 is a view in elevation of an illuminating apparatus for photographic use constructed in accordance with my invention;

Fig. 2 is a vertical sectional view thereof, taken on the line 2—2 of Fig. 1;

Fig. 3 is a broken detail sectional view illustrating another form of combined reflector and diffusing medium; and Fig. 4 is a view corresponding to Fig. 2 but showing another form which an illuminating apparatus constructed in accordance with my invention may assume.

In carrying out my invention, as herein shown, I employ an incandescent bulb 10 mounted within a lamp-housing 11 which rests upon a base 12 and has within its lower end a reflector 13 directly beneath the bulb 10. Resting upon the open upper end of the lamp-housing 11 is a water-compartment 14 having its upper and lower walls 15 and 16 composed of transparent glass or other suitable material, the space between which is filled with a body of water, as indicated in Fig. 2. Light directed upward from the bulb 10 and reflector 13 is compelled to pass through the water in the water-compartment, so that, to a large extent, the heat-rays are checked. The said housing 11 serves as a shield to prevent the bulb 10 from shining directly upon the subject. In the structure shown, the shield is opaque, but if desired it may be made semi-transparent.

Immediately to the rear of the lamp-housing 11 I position a vertical reflecting-and-diffusing panel 17 which, as shown, comprises a front layer 18 of ground glass or other suitable diffusing medium and a layer 19 of transparent glass, the back of which is provided with a coating 20 of silver or the like to reflect the light emanating from the bulb 10 forward toward the subject.

Arranged above the reflecting-and-diffusing panel 17 I position in series two additional inclined diffusing-and-reflecting panels 21 and 22, the former being but slightly inclined with respect to the panel 17 and the latter being, in turn, slightly inclined with respect to the panel 21. The panels 21 and 22 just mentioned correspond to the panel 17, and bear corresponding reference numerals to designate their several parts.

Forward of the lamp-housing 11 and upstanding from the base 12, I position a shield 23 upon the upper end of which is mounted an inclined mirror 24 which serves to reflect stray rays back against the panels 17, 21 and 22. The said shield 23 serves to conceal the lamp-housing 11 and wiring from the view of the subject.

In the operation of my improved illuminating apparatus, as shown in Figs. 1 and 2, the light rays projected upward from the bulb 10 are cooled by their passage through the water in the compartment 14 and pass through the ground-glass diffusing medium 18 of the respective panels 17, 21 and 22, by which they are broken up and diffused, and impinge upon the reflecting coatings 20, by which they are reflected outward toward the subject and caused to repass through the diffusing mediums 18 of the various panels and further diffused and broken up before they reach the subject who, by this double diffusion, is spared the discomfort of any appreciable glare.

In Fig. 3 of the drawings I have illustrated a section of a panel which consists of a single thickness 25 of glass or other suitable material which is provided upon its rear face with a coating 26 of silver or other reflecting material, and on its opposite face with a coating 27 of a so-called ground-glass compound. The panel just described discharges all the functions of the type shown in Fig. 2 and may be readily substituted therefor if desired.

In Fig. 4 of the drawings I have illustrated another arrangement of parts to secure substantially the same result obtained by the structure of Figs. 1 and 2. In this figure I employ a vertical mirror panel 28 and two inclined mirror panels 29 and 30 arranged in the manner of the panels 17, 21 and 22 respectively shown in Fig. 3. Directly above the water-compartment 14 I mount a sheet 31 of ground glass or other suitable diffusing medium through which the rays of light must pass before impinging upon the panels 28, 29 or 30, by which latter they are reflected outward toward the subject and are caused to pass through a second diffusing-plate 32 spaced in front of the said panels 28, 29 and 30.

It will be noted that the light thrown upon the subject by the apparatus illustrated in Fig. 4 is diffused, reflected and again diffused with substantially the same effect as that produced by the apparatus illustrated in Figs. 1 and 2.

I wish to have it understood that I do not limit myself to reflectors and diffusing elements of any particular character, since it is obvious that a wide range of material may be employed for the purpose, it being essential only that the respective elements of whatever composed be capable of discharging their respective functions.

I claim:

1. An illuminating apparatus for photographic use comprising a source of artificial light; a shield for preventing the rays of light emanating from the said source from beating unmodified upon the subject; reflecting-means positioned to reflect light upon the subject; semi-transparent light-diffusing means interposed between the said light-source and the reflecting-means and also between the latter and the subject and having a forward light-receiving mat-surface; whereby light rays emanating from the said light-source and impinging upon the said reflecting-means are diffused before being reflected by the said reflecting-means and again diffused after being reflected thereby toward the subject, and whereby undiffused reflected rays are prevented from reaching the subject.

2. An illuminating apparatus for photographic use comprising a source of artificial light; a shield for preventing the rays of light emanating from the said source from beating unmodified upon the subject; reflecting-means positioned to reflect light upon the subject; a single semi-transparent light-diffusing plate interposed between the said light-source and the reflecting-means and also between the latter and the subject and having a forward light-receiving mat-surface; whereby light rays emanating from the said light-source and impinging upon the said reflecting-means are diffused before being reflected by the said reflecting-means and again diffused after being reflected thereby toward the subject, and whereby undiffused reflected rays are prevented from reaching the subject.

3. An illuminating apparatus for photographic use comprising a source of artificial light; a shield for preventing the rays of light emanating from the said source from beating unmodified upon the subject; reflecting-means positioned to reflect light upon the subject; semi-transparent light-diffusing means arranged parallel with the light-source and the reflecting-means and also between the latter and the subject and having a forward light-receiving mat-surface; whereby light rays emanating from the said light-source and impinging upon the said reflecting-means are diffused before being reflected by the said reflecting-means and again diffused after being reflected thereby toward the subject, and whereby undiffused reflected rays are prevented from reaching the subject.

4. An illuminating apparatus for photographic use comprising a source of artificial light; a shield for preventing the rays of light emanating from the said source from beating unmodified upon the subject; reflecting-means positioned to reflect light upon the subject; a single semi-transparent light-diffusing plate arranged parallel with the light-source and the reflecting-means and also between the latter and the subject and having a forward light-receiving mat-surface; whereby light rays emanating from the said light-source and impinging upon the said reflecting-means are diffused before being reflected by the said reflecting-means and again diffused after being reflected thereby toward the subject, and whereby undiffused reflected rays are prevented from reaching the subject.

In testimony whereof, I have signed this specification.

LUTHER G. SIMJIAN.